(12) United States Patent
Khurange et al.

(10) Patent No.: US 10,824,516 B2
(45) Date of Patent: Nov. 3, 2020

(54) METHOD AND SYSTEM OF UNIVERSAL SERVER MIGRATION

(71) Applicants: Ashish Govind Khurange, Pune (IN); Sachin Baban Durge, Pune (IN); Kulangara Kuriakose George, Pune (IN); Kuldeep Sureshrao Nagarkar, Pune (IN); Ravender Goyal, Saratoga, CA (US); Nitin Anand, Pune (IN); Supriya Sitaram Dere, Pune (IN)

(72) Inventors: Ashish Govind Khurange, Pune (IN); Sachin Baban Durge, Pune (IN); Kulangara Kuriakose George, Pune (IN); Kuldeep Sureshrao Nagarkar, Pune (IN); Ravender Goyal, Saratoga, CA (US); Nitin Anand, Pune (IN); Supriya Sitaram Dere, Pune (IN)

( * ) Notice: Subject to any disclaimer, the term of this patent is extended or adjusted under 35 U.S.C. 154(b) by 342 days.

(21) Appl. No.: 14/979,528

(22) Filed: Dec. 28, 2015

(65) Prior Publication Data

US 2017/0185492 A1    Jun. 29, 2017

(51) Int. Cl.
*G06F 17/30* (2006.01)
*G06F 11/14* (2006.01)

(52) U.S. Cl.
CPC ...... *G06F 11/1469* (2013.01); *G06F 11/1451* (2013.01); *G06F 11/1453* (2013.01)

(58) Field of Classification Search
CPC ............. G06F 11/1469; G06F 11/1451; G06F 11/1453; G06F 2201/815
See application file for complete search history.

(56) References Cited

U.S. PATENT DOCUMENTS

2003/0221095 A1* 11/2003 Gaunt ................ G06F 11/1417
713/1

* cited by examiner

*Primary Examiner* — Syed H Hasan

(57) ABSTRACT

In one embodiment, a computer-implemented method for server migration includes the step of, with an agent running inside a server, capturing a server image of the server, wherein the server image is independent of a source-compute infrastructure. The method includes the step of transferring the server image to a dedupe store. The method includes the step of transforming the dedupe stream of the server image into a bootable server image on a target compute infrastructure. The method includes the step of generating a recovery set of disks on the target compute infrastructure. The method includes the step of creating a recover-process server on the target compute infrastructure using a recovery set of disks.

6 Claims, 4 Drawing Sheets

METHOD AND SYSTEM OF UNIVERSAL SERVER MIGRATION

BACKGROUND

1. Field

This application relates generally to data storage, and more specifically to a system, article of manufacture and method of methods and systems of a universal server migration.

2. Related Art

With the rise in adoption of virtual environment, hyper-converged storage solutions and cloud computing there is a need of server migrator solution. A migrator solution can be used for the on-boarding of existing compute infrastructure on a different compute infrastructure (e.g. a virtual environment, a hyper-converged storage and/or cloud platform, etc.).

BRIEF SUMMARY OF THE INVENTION

In one embodiment, a computer-implemented method for server migration includes the step of, with an agent running inside a server, capturing a server image of the server, wherein the server image is independent of a source-compute infrastructure. The method includes the step of transferring the server image to a dedupe store. The method includes the step of transforming the dedupe stream of the server image into a bootable server image on a target compute infrastructure. The method includes the step of generating a recovery set of disks on the target compute infrastructure. The method includes the step of creating a recover-process server on the target compute infrastructure using a recovery set of disks.

Figure 1:
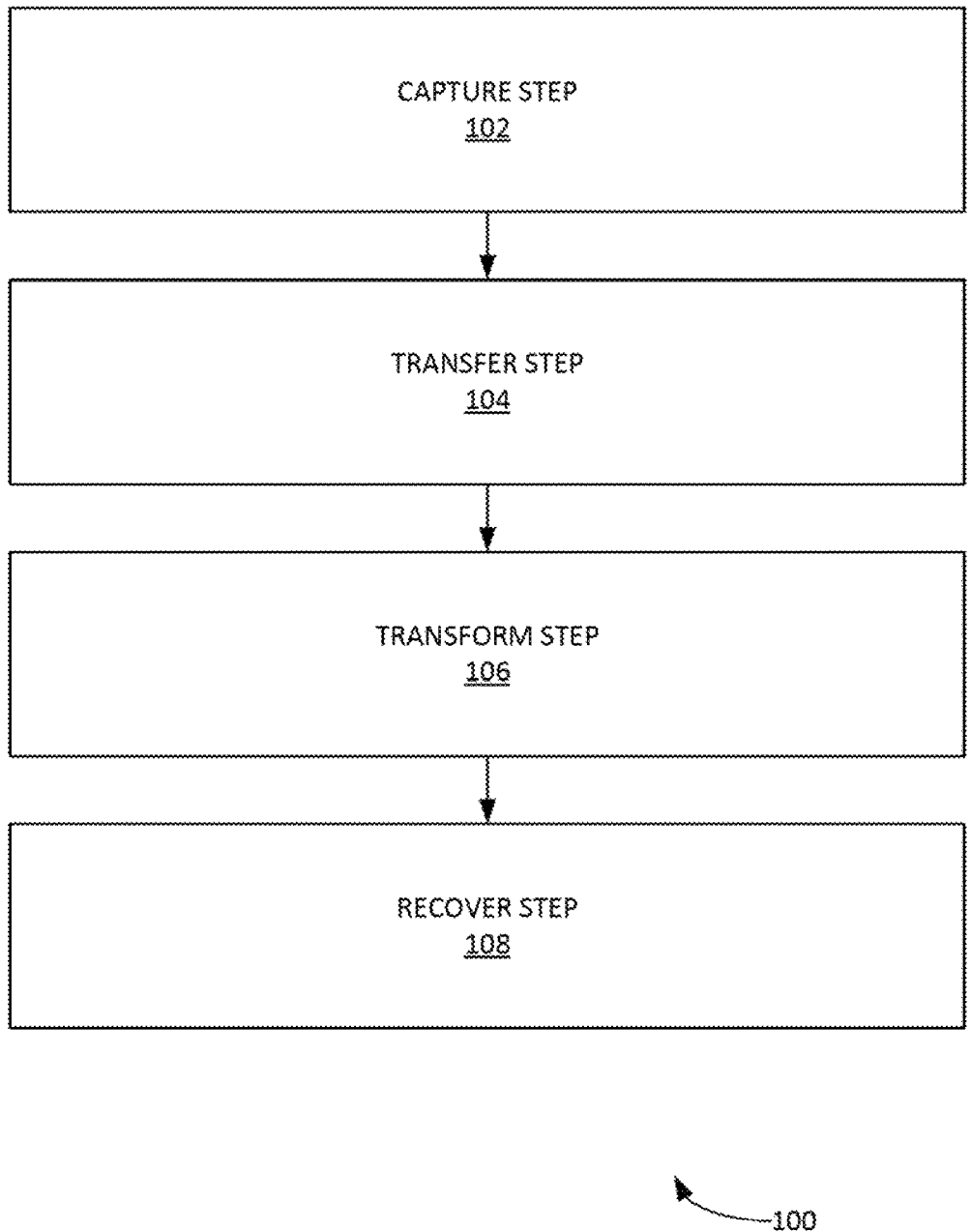
FIG. 1 illustrates an example process for universal server migration, according to some embodiments.

The Figures described above are a representative set, and are not an exhaustive with respect to embodying the invention.

DESCRIPTION

Disclosed are a system, method, and article of manufacture of methods and systems of a universal server migration. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application server can be, inter alia, a software framework that provides a generalized approach to creating an application-server implementation, regard to what the application functions are and/or the server portion of a specific implementation instance. The server's function can be dedicated to the execution of procedures (e.g. programs, routines, scripts) for supporting its applied applications. An application server can be an example of a physical server.

Backup image (or image) can include copies of programs, system settings, files, etc. It can be a complete system backup that can be used for restore operations.

Cloud computing can be computing that can involve a large number of computers connected through a communication network such as the Internet. Cloud computing can be a form of distributed computing over a network, and can include the ability to run a program or application on many connected computers at the same time.

Cloud storage can be a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Compute infrastructure can include infrastructure for running a server (e.g. Windows® servers, Linux® servers, etc.). This can include a physical server, a virtual environment (e.g. HyperV®, VMWare®, Xen®, KVM®, etc.), a hyper-converged storage solutions (e.g. Nutanix®, Tintri®, Simplivity®, etc.) and/or a cloud computing platform (e.g. Azure®, Amazon® cloud, Google® cloud, etc.).

Dedupe storage network can be represented in the form of a graph topology, where node represents dedupe storage node, and the directed edge represent the data replication path. In dedupe storage network data is replicated in dedupe preserving manner. A data chunk which is present at a dedupe storage node is never replicated to that same storage node by any other storage node in the dedupe storage network.

Recovery set of disks can include a set of disks used to recover captured data from a source server. The set of disks can be used to create a bootable image of source server on target compute infrastructure.

Recovery agent can be a server that fetches a server image data in dedupe form (e.g. from a SUREedge dedupe server) and recovers it over a recovery set of disks.

Hyper-converged storage is a software-defined approach to storage management that combines storage, compute, networking and virtualization technologies in one physical unit that is managed as a single system.

Exemplary Methods

A universal-server migration mechanism of server migration can be universally applicable to any target compute infrastructure. A universal-migrator method can migrate servers from any source compute infrastructure to any target compute infrastructure.

FIG. 1 illustrates an example process 100 for universal server migration, according to some embodiments. In step 102, an agent running inside a server captures the image of the server. The server image includes partition table metadata for all the disks inside the server (e.g. MBR, EBR, GPT, LDM, LVM partitions). The server image also includes the allocated data blocks from all the file systems inside the server (FAT, NTFS, ReFS, Ext2,3,4, XFS, BTRFS etc. file systems). The capture process can create a server image. The server image can be independent of the source compute infrastructure. With capture step 102, process 100 can capture the server image of servers running in any compute infrastructure (e.g. a physical infrastructure, a virtual infrastructure, a hyper-converged storage environment, a cloud environment, etc.). In some embodiments, capture step 102 can be a compute infrastructure independent process.

In step 104, the server image captured in the capture process can be transferred to the dedupe store (e.g. SUREedge® dedupe store, etc.). The captured image may not be staged. Capture process 100 can implement an inline transfer of the captured image to the dedupe store. The dedupe store can implement an inline dedupe of an incoming server image. In some embodiments, transfer step 104 can be a compute infrastructure independent process.

In step 106, a transform process can transform the dedupe stream of a server image into a bootable server image on the target compute infrastructure. Transform process 106 can be target compute infrastructure dependent. Transform process step 106 can first create a recovery set of disks on the target compute infrastructure. The format of the disks can be compatible with the target-compute infrastructure. For example, in case of a Microsoft® HyperV the disk format can be VHDX (e.g. a Hyper-V virtual hard disk (VHD) format found in Windows Server 2012). In the case of VMWare®, the disk format can be VMDK (e.g. a file format that describes containers for virtual hard disk drives to be used in virtual machines like VMware Workstation and/or VirtualBox). Accordingly, the server image can be fetched from the dedupe store and is recovered on the recovery disks set. At the end-boot loader, device drivers and tools used for the server to function properly in the target compute infrastructure can be injected into the recovered image. At the end of transform process step 106, the bootable recovery set of disks are ready.

It is noted that transform step 106 is target compute infrastructure dependent. A simplified interface can be used to implement transform step 106 in order to support proliferation. Transform step 106 can include making the server images bootable. This can be done by injecting the boot loader, required device drivers and other tools. A Windows® recovery agent can be used to transform Windows® server images. Similarly, a Linux recovery agent can be used to transform Linux® server images.

In step 108, the recover-process server can be created on the target compute infrastructure using a recovery set of disks created in transform step 106. Recover process step 108 can be target compute-infrastructure dependent.

Figure 2:
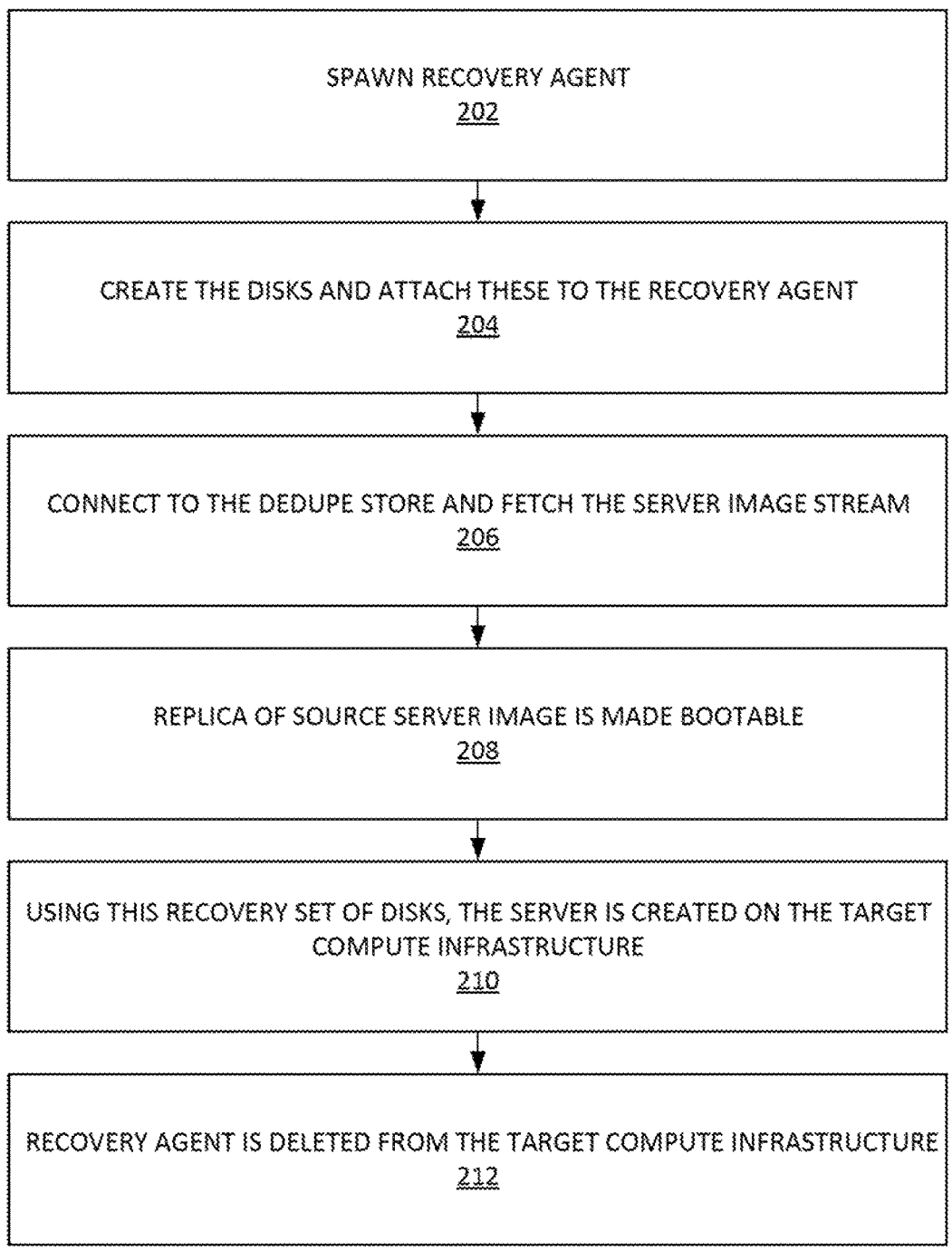
FIG. 2 illustrates an example transform process, according to some embodiments.

FIG. 2 illustrates an example transform process 200, according to some embodiments. In some embodiments, transform process 200 can be utilized in process 100 discussed supra. In step 202, process 200 can spawn a recovery agent. For example, on the target compute infrastructure, to recover a Windows® server can spawn a Windows recovery agent. A Linux® server can spawn a Linux® recovery agent.

In step 204, process 200 can create the recovery set of disks and attach these to the recovery agent. For example, in the capture phase of a server the information disks attached to the server are captured. Process 200 can use this information to create the recovery set of disks. Process 200 can attach the recovery set of disks to the recovery agent. These disks form the recovery set.

In step 206, process 200 can connect to the dedupe store and fetch the server image stream. For example, the recovery agent can connect to the dedupe store and fetch the server image stream. The server image stream can be written on the recovery set of disks. First the partition table metadata from the server image is written on the recovery set of disks. This creates the on disk layout of data volumes exactly similar to the source server. Then on each of the data volume created on recovery set of disks, the corresponding file system contents from server image are written. This recreates the replica of source server image on the recovery set of disks.

In step 208, a replica of source server image can be made bootable. For example, the replica of the source-server image can be made bootable on the target compute infrastructure. In one example, a boot loader, device drivers and tools can be injected into the server image that is recovered from the recovery set of disks.

In step 210, process 200 can use the recovery set of disks of the server to create a server on the target compute infrastructure. It is noted that the created bootable recovery set of disks are self-sufficient to create server on the target compute infrastructure. In one example, step 210 can be implemented after this the recovery set of disks is detached from the recovery agent. In step 212, the recovery agent can be deleted from the target compute infrastructure.

It is noted that, in some embodiments, steps 206 and/or 208 can be target compute infrastructure independent. The recovery agent creation, disk creation, disk attach, disk detach, recovery agent deletion and/or server creation can be target-compute infrastructure dependent.

Exemplary Systems

Figure 3:
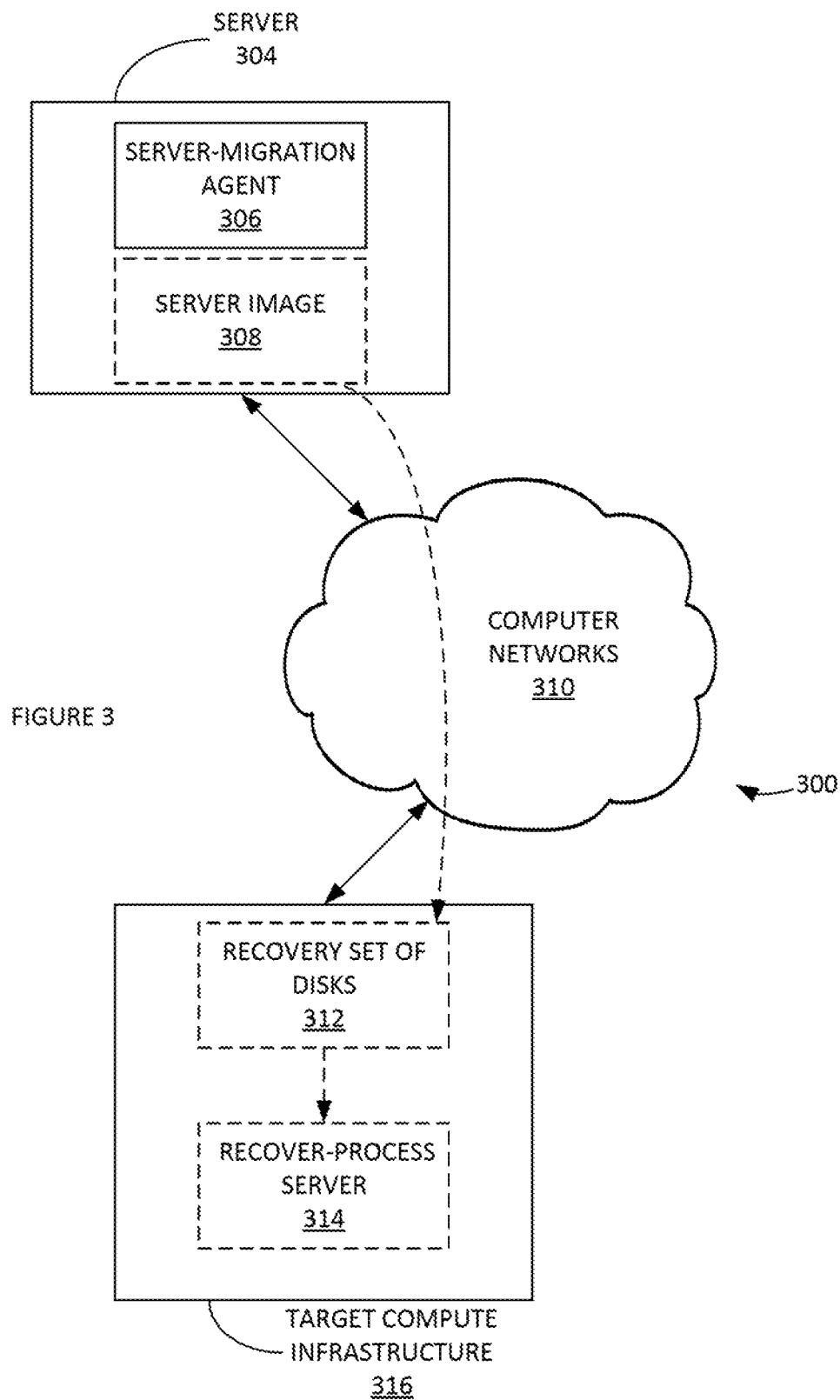
FIG. 3 illustrates an example system for server migration, according to some embodiments.

FIG. 3 illustrates an example system 300 for server migration, according to some embodiments. System 300 can include server 304. Server 304 can be a source server. The image of server 304 can be migrated to another entity. Server-migration agent 306 can run inside server 304. Server-migration agent 306 can capture the server image 308 of server 304. Server image 308 can include partition table metadata of all the disks and allocated data blocks of all the filesystems inside the server 304. Server image can be independent of the source compute infrastructure of server 304. Computer networks 310 can be any computer network (e.g. the Internet), enterprise network, wide-area network, etc.

Recovery set of disks 312 can include a set of disks used to recover captured data from a source server. The set of disks can be used to create a bootable image of source server on target compute infrastructure.

Target compute infrastructure 316 can include infrastructure for running a server. This can include a physical server, a virtual environment, a hyper-converged storage solutions and/or a cloud computing platform. Target computer infrastructure 316 can further include a recovery agent (not shown). Recovery agent can fetch server image data in dedupe from a dedupe server (not shown) and recover it over the recovery set of disks. Accordingly recover process server 314 can be created on target compute infrastructure using the recovery set of disks.

Figure 4:
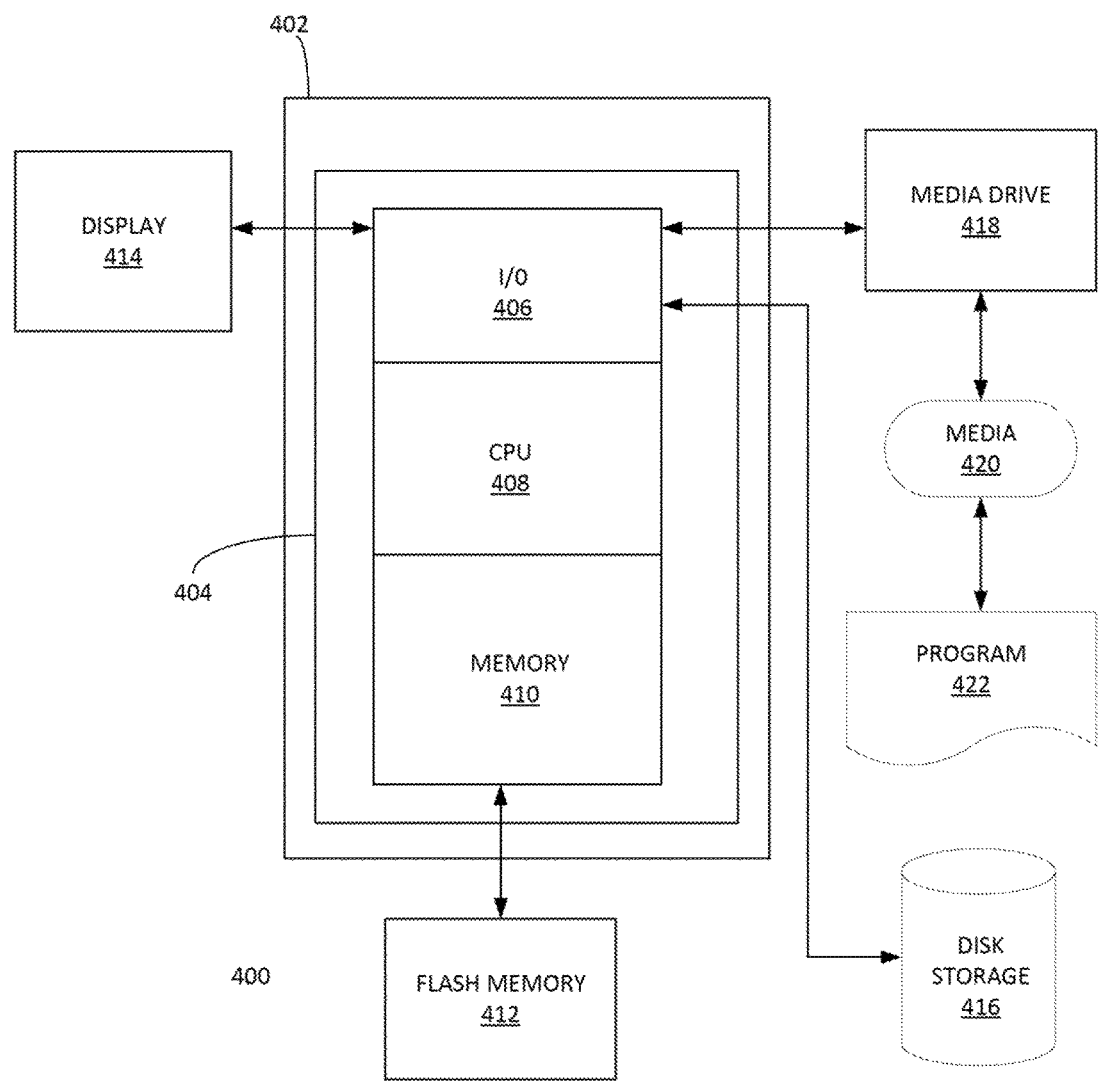
FIG. 4 depicts an exemplary computing system that can be configured to perform any one of the processes provided herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic dedupe area communication protocol, etc.

It is noted that a software-development kit (SDK) can be provided for migration. For each target-compute infrastructure platform a plug-in can be developed and made available. The SDK can have application programming interfaces (APIs) for, inter alia: recovery agent creation; disk creation; disk attach; disk detach; deleting recovery agent; creating server with set of recovery disks; etc. Implementing this plug-in, an entity can add support for server migration to a new compute infrastructure platform.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method for server migration comprising:
    with an agent running inside a server, capturing a server image of the server, wherein the server image is independent of a source-compute infrastructure, and wherein the server image comprises a partition table metadata of all of a set of disks and of a set of allocated data blocks of all of a set of filesystems inside the server;
    transferring the server image to a dedupe store, wherein the dedupe store implements an inline dedupe of an incoming server image, and wherein a data chunk is present in the dedupe store in dedupe preserving manner so that the data chunk is never replicated to dedupe store by another storage node;
    transforming a dedupe stream of the server image into a bootable server image on a target compute infrastructure, wherein in the target compute infrastructure comprises a different compute infrastructure than the source compute infrastructure, the server image was captured from, and wherein the transformation of the dedupe stream is dependent on the target compute infrastructure;
    generating a recovery set of disks on the target compute infrastructure; and
    creating a recover-process server on the target compute infrastructure using a recovery set of disks.

2. The computer-implemented method of claim 1, wherein the server image is of a physical-infrastructure server, a virtual-infrastructure server, a hyper-converged storage environment server or a cloud-environment server.

3. A computer-implemented method for server migration comprising:

spawning a recovery agent in a target compute infrastructure;

creating a recovery set of disks;

attaching the recovery set of disks to the recovery agent;

providing a dedupe store, wherein the dedupe store provides a source-server image stream, wherein the source-server image is made bootable by injecting a boot loader and a device driver-into the source-server image that is recovered from the recovery set of disks;

fetching a server image stream from the dedupe store, wherein the dedupe store implements an inline dedupe of an incoming server image, and wherein a data chunk is present in the dedupe store in dedupe preserving manner so that the data chunk is never replicated to dedupe store by another storage node;

writing the server image stream onto the recovery set of disks, wherein the recovery set of disks comprises a replica of the source-server image stream;

with the recovery set of disks, recreating a source server in the target compute infrastructure, wherein in the target compute infrastructure comprises a different compute infrastructure than the server the server image was captured from; and deleting the recovery agent from the target compute infrastructure.

4. The computer-implemented method of claim 3, wherein the target compute infrastructure is of a physical-infrastructure, a virtual-infrastructure a hyper-converged storage environment or a cloud environment.

5. The computer-implemented method of claim 3, wherein to recover a Linux server, Linux recovery agent is created and to recover a Windows server, Windows recovery agent is created.

6. A computer-implemented method for server migration comprising:

spawning a recovery agent in a target compute infrastructure;

creating a recovery set of disks compatible with the target compute infrastructure;

attaching the recovery set of disks to the recovery agent;

providing a dedupe store, wherein the dedupe store provides a source-server image stream, wherein the source-server image is made bootable by injecting a boot loader and a device driver into the source-server image that is recovered from the recovery set of disks, wherein the dedupe store implements an inline dedupe of an incoming server image, and wherein a data chunk is present in the dedupe store in dedupe preserving manner so that the data chunk is never replicated to dedupe store by another storage node;

fetching a server image stream from the dedupe store;

writing the server image stream onto the recovery set of disks, wherein the recovery set of disks comprises a replica of the source-server image stream;

with the recovery set of disks, recreating a source server in the target compute infrastructure, wherein the transformation of the dedupe stream is dependent on the target compute infrastructure; and deleting the recovery agent from the target compute infrastructure.

* * * * *